(12) United States Patent
Dietrich et al.

(10) Patent No.: US 7,451,122 B2
(45) Date of Patent: Nov. 11, 2008

(54) EMPIRICAL DESIGN OF EXPERIMENTS USING NEURAL NETWORK MODELS

(75) Inventors: Paul F. Dietrich, Brooklyn Park, MN (US); Sunil K. Menon, Golden Valley, MN (US); Dinkar Mylaraswamy, Fridley, MN (US); Lewis P. Olson, Apple Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 280 days.

(21) Appl. No.: 11/394,317

(22) Filed: Mar. 29, 2006

(65) Prior Publication Data
US 2007/0239633 A1    Oct. 11, 2007

(51) Int. Cl.
G06E 1/00 (2006.01)
G06E 3/00 (2006.01)
G06F 15/18 (2006.01)
G06G 7/00 (2006.01)
G06N 3/02 (2006.01)

(52) U.S. Cl. ...................................................... 706/15
(58) Field of Classification Search ....................... None
See application file for complete search history.

(56) References Cited

U.S. PATENT DOCUMENTS

| | | | |
|---|---|---|---|
| 5,091,843 A | 2/1992 | Peczkowski | |
| 5,461,699 A * | 10/1995 | Arbabi et al. | 706/21 |
| 5,633,800 A | 5/1997 | Bankert et al. | |
| 5,684,946 A | 11/1997 | Ellis et al. | |
| 5,781,430 A | 7/1998 | Tsai | |
| 5,980,096 A * | 11/1999 | Thalhammer-Reyero | 707/100 |
| 6,161,054 A * | 12/2000 | Rosenthal et al. | 700/121 |
| 6,249,712 B1 * | 6/2001 | Boiquaye | 700/31 |
| 6,353,804 B1 | 3/2002 | Bowman | |
| 6,411,945 B1 | 6/2002 | Nakajima | |
| 6,430,993 B1 | 8/2002 | Seta | |
| 6,496,347 B1 | 12/2002 | Christensen et al. | |
| 6,604,092 B1 | 8/2003 | Stewart | |
| 6,606,612 B1 | 8/2003 | Rai et al. | |

(Continued)

OTHER PUBLICATIONS

Fault diagnosis in gas turbine engines using fuzzy logic Gayme, D.; Menon, S.; Ball, C.; Mukavetz, D.; Nwadiogbu, E.; Systems, Man and Cybernetics, 2003. IEEE International Conference on vol. 4, Oct. 5-8, 2003 pp. 3756-3762 vol. 4.*

(Continued)

Primary Examiner—Michael B Holmes
(74) Attorney, Agent, or Firm—Ingrassia, Fisher & Lorenz, P.C.

(57) ABSTRACT

Methods and apparatus are provided pertaining to a design of experiments. The method comprises generating a data set from historical data; identifying and removing any fault data points in the data set so as to create a revised data set; supplying the data points from the revised data set into a nonlinear neural network model; and deriving a simulator model characterizing a relationship between the input variables and the output variables. The apparatus comprises means for generating a data set from historical data; means for identifying and removing any fault data points in the data set so as to create a revised data set; means for supplying the data points from the revised data set into a nonlinear neural network model; and means for deriving a simulator model characterizing a relationship between the input variables and the output variables.

24 Claims, 7 Drawing Sheets

U.S. PATENT DOCUMENTS

| | | | |
|---|---|---|---|
| 6,678,668 | B2 | 1/2004 | Fisher et al. |
| 6,718,288 | B1 | 4/2004 | Wakeman |
| 6,725,112 | B1 | 4/2004 | Kaminsky et al. |
| 6,773,149 | B2 | 8/2004 | Kulkarni et al. |
| 6,836,754 | B2 | 12/2004 | Cooper |
| 6,850,877 | B1 | 2/2005 | Sengupta |
| 6,868,716 | B2 | 3/2005 | Okano et al. |
| 6,910,947 | B2* | 6/2005 | Paik .............................. 451/21 |
| 6,961,636 | B1* | 11/2005 | Chong et al. ................. 700/121 |
| 7,069,198 | B2* | 6/2006 | Snyder et al. ................... 703/2 |
| 7,101,799 | B2* | 9/2006 | Paik ............................ 438/692 |
| 7,110,924 | B2* | 9/2006 | Prewett et al. .................. 703/2 |
| 7,164,954 | B2* | 1/2007 | Lefebvre et al. ............... 700/47 |
| 7,194,320 | B2* | 3/2007 | Lefebvre et al. ............... 700/49 |
| 7,364,846 | B2* | 4/2008 | Erlander et al. ................. 435/6 |
| 7,400,935 | B2* | 7/2008 | Lefebvre et al. ............... 700/47 |
| 2002/0138457 | A1 | 9/2002 | Jin et al. |
| 2002/0183986 | A1 | 12/2002 | Stewart et al. |
| 2003/0036891 | A1 | 2/2003 | Aragones et al. |
| 2003/0062339 | A1 | 4/2003 | Houge et al. |
| 2003/0074171 | A1 | 4/2003 | Desai et al. |
| 2003/0200069 | A1 | 10/2003 | Volponi |
| 2003/0237058 | A1 | 12/2003 | Burghaus et al. |
| 2004/0019469 | A1 | 1/2004 | Leary et al. |
| 2004/0107082 | A1 | 6/2004 | Sato et al. |
| 2004/0117161 | A1 | 6/2004 | Burdgick et al. |
| 2004/0143834 | A1 | 7/2004 | O'Rourke et al. |
| 2004/0148049 | A1 | 7/2004 | Schwarm |
| 2004/0148940 | A1 | 8/2004 | Venkateswaran et al. |

OTHER PUBLICATIONS

Fault detection and diagnosis in turbine engines using fuzzy logic Gayme, D.; Menon, S.; Ball, C.; Mukavetz, D.; Nwadiogbu, E.; Fuzzy Information Processing Society, 2003. NAFIPS 2003. 22nd International Conference of the North American Jul. 24-26, 2003 pp. 341-346 Digital Object Identifier 10.1109/NAFIPS.2003.1226808.*

Micromachined silicon fuel atomizers for gas turbine enginesSingh, A.; Mehregany, M.; Phillips, S.M.; Harvey, R.J.; Benjamin, H.; Micro Electro Mechanical Systems, MEMS '96, Proceedings. 'An Investigation of Micro Structures, Sensors, Actuators, Machines and Systems'. IEEE, The Ninth Annual International Workshop on 1996 pp. 473-478.*

Validation of design for space launch vehicles Jambor, B.J.; Eger, G.W.; Layton, S.D.; Real-Time Systems Symposium, 1993., Proceedings. Dec. 1-3, 1993 pp. 244-248 Digital Object Identifier 10.1109/REAL. 1993.393494.*

Fault Injection for Semi-Parametric Reliability Models White, A.L.; Aerospace Conference, 2005 IEEE Mar. 5-12, 2005 pp. 1-20 Digital Object Identifier 10.1109/AERO.2005.1559344.*

Interconnect Delay Fault Test on Boards and SoCs with Multiple Clock Domains Hyunbean Yi; Jaehoon Song; Sungju Park; Test Conference, 2006. ITC '06. IEEE International Oct. 2006 pp. 1-7 Digital Object Identifier 10.1109/TEST.2006.297632.*

Target tracking: a real-time object oriented design experiment Krasovec, G.; Baker, M.; Gheorghe, S.; Engineering of Complex Computer Systems, 1995. Held jointly with 5th CSESAW, 3rd IEEE RTAW and 20th IFAC/IFIP WRTP, Proceedings., First IEEE International Conference on Nov. 6-10, 1995 pp. 290-297 Digital Object Identifier 10.1109/ICECCS.1995.*

An Experiment-Based Methodology for Robust Design of Optimal Residual Generators Romano, D.; Kinnaert, M.; Decision and Control, 2005 and 2005 European Control Conference. CDC-ECC '05. 44th IEEE Conference on Dec. 12-15, 2005 pp. 6286-6291.*

Statistical analysis of particle/defect data experiments using Poisson and logistic regression Ramirez, J.G.; Collica, R.S.; Cantell, B.S.; Defect and Fault Tolerance in VLSI Systems, 1994. Proceedings., The IEEE International Workshop on Oct. 17-19, 1994 pp. 230-238 Digital Object Identifier 10.1109/DFTVS.1994.630034.*

Synthesis of SEU-tolerant ASICs using concurrent error correction Hollander, H.; Carlson, B.S.; Bennett, T.D.; VLSI, 1995. Proceedings., Fifth Great Lakes Symposium on Mar. 16-18, 1995 pp. 90-93 Digital Object Identifier 10.1109/GLSV.1995.516031.*

Fault-injection experiments for distributed objects Chung, P.E.; Woei-Jyh Lee; Shih, J.; Yajnik, S.; Yennun Huang; Distributed Objects and Applications, 1999. Proceedings of the International Symposium on Sep. 5-6, 1999 pp. 88-97 Digital Object Identifier 10.1109/DOA.1999.793991.*

Semi-empirical neural network modeling of metal-organic chemical vapor deposition Nami, Z.; Misman, O.; Erbil, A.; May, G.S.; Semiconductor Manufacturing, IEEE Transactions on vol. 10, Issue 2, May 1997 pp. 288-294 Digital Object Identifier 10.1109/66.572084.*

Using neural network process models to perform PECVD silicon dioxide recipe synthesis via genetic algorithms Seung-Soo Han; May, G.S.; Semiconductor Manufacturing, IEEE Transactions on vol. 10, Issue 2, May 1997 pp. 279-287 Digital Object Identifier 10.1109/66.572083.*

Modeling ceramic filled polymer integrated capacitor formation using neural networks Thongvigitmanee, T.; May, G.S.; Advanced Packaging Materials: Processes, Properties and Interfaces, 1999. Proceedings. International Symposium on Mar. 14-17, 1999 pp. 174-177 Digital Object Identifier 10.1109/ISAPM.1999.757307.*

Modeling of dry development in bilayer-resist process for 140-nm contact hole patterning Sung Bo Hwang; Kim, W.D.; Edgar, T.F.; Semiconductor Manufacturing, IEEE Transactions on vol. 15, Issue 2, May 2002 pp. 245-252 Digital Object Identifier 10.1109/66.999599.*

Modeling and optimization of integral capacitor fabrication using neural networks Thongvigitmanee, T.; May, G.S.; Electronics Manufacturing Technology Symposium, 2000. Twenty-Sixth IEEE/CPMT International Oct. 2-3, 2000 pp. 47-54 Digital Object Identifier 10.1109/IEMT.2000.910707.*

Modeling via formation in photosensitive MCM dielectric materials using sequential neural networks Kim, T.S.; May, G.S.; Electronics Manufacturing Technology Symposium, 1998. Twenty-Third IEEE/CPMT Oct. 19-21, 1998 pp. 401-408 Digital Object Identifier 10.1109/IEMT.1998.731165.*

Modeling ceramic filled polymer integrated capacitor formation using neural networks Thongvigitmanee, T.; May, G.S.; Electronics Packaging Manufacturing, IEEE Transactions on vol. 22, Issue 4, Oct. 1999 pp. 314-318 Digital Object Identifier 10.1109/6104.816101.*

Optimization of nanocomposite integral capacitor fabrication using neural networks and genetic algorithms Thongvigitmanee, T.; May, G.S.; Electronics Manufacturing Technology Symposium, 2002. IEMT 2002. 27th Annual IEEE/SEMI International Jul. 17-18, 2002 pp. 123-129 Digital Object Identifier 10.1109/IEMT.2002.1032737.*

Sequential modeling of via geometry in photosensitive MCM dielectric materials using neural networks Tae Seon Kim; May, G.S.; Advanced Packaging Materials, 1998. Proceedings. 1998 4th International Symposium on Mar. 15-18, 1998 pp. 93-99 Digital Object Identifier 10.1109/ISAPM.1998.664441.*

Modeling of via formation by photsensitive dielectric materials for MCM applications Tae Seon Kim; May, G.S.; Properties and Applications of Dielectric Materials, 1997., Proceedings of the 5th International Conference on vol. 2, May 25-30, 1997 pp. 930-933 vol. 2 Digital Object Identifier 10.1109/ICPADM.1997.616592.*

* cited by examiner

| FACTOR | TYPE | LEVELS | STATISTICAL MEASURE VALUES (MIN, MEDIAN, MAX) |
|---|---|---|---|
| TAT | FIXED | 3 | [-1.0, 29.5, 38.5] |
| ALT | FIXED | 3 | [-500, 156, 2980] |
| P2A | FIXED | 3 | [12.0, 13.6, 14.2] |
| GLA | FIXED | 3 | [0, 33, 79] |
| WB | FIXED | 3 | [806, 810, 1168] |
| PT | FIXED | 3 | [14.7, 50.3, 59.6] |
| IGV | FIXED | 3 | [17, 21, 82] |
| SCV | FIXED | 3 | [19, 68, 89] |
| LOT | FIXED | 3 | [86, 119, 156] |

| SOURCE | DF | SEQ SS | ADJ SS | ADJ MS | F | P |
|---|---|---|---|---|---|---|
| TAT | 2 | 528636 | 528636 | 264318 | 1101.31 | 0.000 |
| ALT | 2 | 6678613 | 6678613 | 3339307 | 1.4E + 04 | 0.000 |
| P2A | 2 | 4219320 | 4219320 | 2109660 | 8790.15 | 0.000 |
| GLA | 2 | 657514 | 657514 | 328757 | 1369.80 | 0.000 |
| WB | 2 | 1932854 | 1932854 | 966427 | 4026.73 | 0.000 |
| PT | 2 | 346467 | 346467 | 173233 | 721.80 | 0.000 |
| IGV | 2 | 411790 | 411790 | 205895 | 857.89 | 0.000 |
| SCV | 2 | 237196 | 237196 | 118598 | 494.15 | 0.000 |
| LOT | 2 | 13671 | 13671 | 6836 | 28.48 | 0.000 |

EGT* = 690.4 + 0.327 TAT - 0.0122 ALT - 16.0 P2A + 0.224 GLA + 0.0824 WB + 0.186 PT + 0.217 IGV

| PREDICTOR | COEF | SE COEF | T | P | VIF |
|---|---|---|---|---|---|
| CONSTANT | 690.428 | 6.558 | 105.29 | 0.000 | |
| TAT | 0.32726 | 0.02479 | 13.20 | 0.000 | 1.0 |
| ALT | -0.0122461 | 0.0002776 | -44.12 | 0.000 | 1.0 |
| P2A | -16.0029 | 0.4513 | -35.46 | 0.000 | 1.0 |
| GLA | 0.22425 | 0.01294 | 17.34 | 0.000 | 1.0 |
| WB | 0.082421 | 0.002469 | 33.38 | 0.000 | 1.0 |
| PT | 0.18571 | 0.02166 | 8.58 | 0.000 | 1.0 |
| IGV | 0.21731 | 0.01409 | 15.42 | 0.000 | 1.0 |

EMPIRICAL DESIGN OF EXPERIMENTS USING NEURAL NETWORK MODELS

TECHNICAL FIELD

The present invention generally relates to a method and apparatus for empirical designs of experiments, and more particularly relates to a particular design of experiments pertaining to a simulator model using historical data and a nonlinear neural network model.

BACKGROUND

Designs of experiments are often used in studying the effects of multiple input variables upon one or more output variables, such as the quantifiable output of a particular process. For example, designs of experiments can be used in testing the effects of various environmental conditions upon the operation of a particular apparatus, such as a gas turbine engine. In such an example, the input variables can represent certain quantifiable conditions, such as altitude and inlet pressure, and the output variables can represent quantifiable measures representing the operation of an apparatus, such as the exhaust gas temperature of a gas turbine engine. Designs of experiments often use linear models to approximate the relationship between the input variables and the output variables.

Often a design of experiments is conducted by running a series of experiments on an apparatus such as a gas turbine engine. In such experiments, the input variables representing the environmental conditions are systematically altered, and the corresponding effects on the output variables are recorded. However, in many circumstances the physical apparatus may be costly to obtain and/or not readily available. Moreover, it is often difficult, costly and time consuming to properly configure the testing so that the input variables represent the entire range of environmental conditions, and to perform the testing and collect the data from the results of all of the tests to obtain complete and accurate results in the experiments on the apparatus.

An alternative approach, using an accurate model as a proxy for the apparatus, can save a significant amount of time and money with little loss of accuracy, depending on the accuracy of the baseline model. However, frequently the available models are too complex and/or cumbersome to run efficiently, often relying on thousands of data points, and taking weeks or months to run, for example in the case of available finite element models for gas turbine engines. Other available models, such as linear regression models, may not provide a very accurate fit for the data, particularly for nonlinear relationships among the variables.

Accordingly, there is a need for an improved design of experiments for modeling relationships between input variables and output variables associated with the operation of an apparatus or other process, such as the operation of a gas turbine engine, that is more accurate, time effective and/or cost effective than existing models, that does not require running new tests on the apparatus or process, and that does not have the limitations of a linear regression model.

BRIEF SUMMARY OF THE INVENTION

A method is provided for a design of experiments for modeling the effects of two or more input variables on one or more output variables. The method comprises a first step of generating a data set comprising data points from historical data for the input variables and the output variables, each data point comprising corresponding values for one or more input variables and one or more output variables. The method further comprises a second step of identifying any fault data points in the historical data, a fault data point being a data point in which an output variable value is determined to be caused by factors other than the input variables, and a third step of removing the identified fault data points from the data set, thereby generating a revised data set. The method further comprises a fourth step of supplying the data points from the revised data set into a nonlinear neural network model, and a fifth step of deriving a simulator model characterizing a relationship between the input variables and the output variables using the nonlinear neural network model with the supplied data.

An apparatus is provided for modeling the effects of two or more input variables on one or more output variables. The apparatus comprises a means for generating a data set comprising data points from historical data for the input variables and the output variables, in which each data point comprises corresponding values for one or more input variables and one or more output variables. The apparatus further comprises means for identifying any fault data points from the historical data, and means of removing the identified fault data points from the data set, thereby generating a revised data set. The apparatus further comprises means for supplying the data points from the revised data set into a nonlinear neural network model, and means for deriving a simulator model characterizing a relationship between the input variables and the output variables using the nonlinear neural network model with the supplied data.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figures 1, 2:
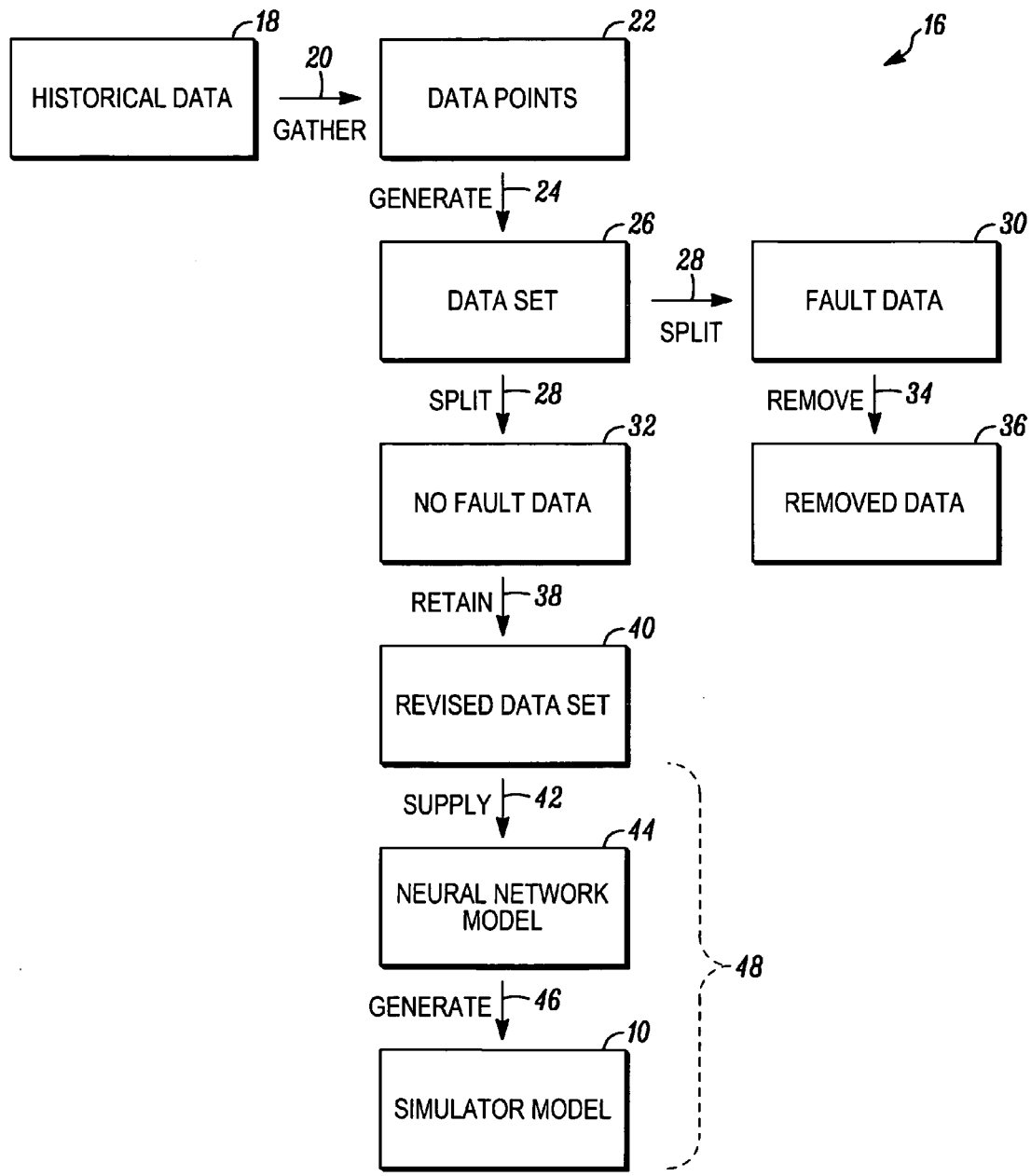
FIG. 1 depicts a flowchart illustrating a basic objective of a design of experiments, as known in the prior art.
FIG. 2 depicts one embodiment of a method for a design of experiments.

FIG. 1 depicts a flowchart illustrating a basic objective of the invention, namely to create a simulator model 10 for modeling the effects of two or more input variables 12 on one or more output variables 14. In a preferred embodiment, the simulator model 10 pertains to a gas turbine engine for an aircraft. In this preferred embodiment, the input variables 12 comprise various operating conditions affecting performance of a gas turbine engine, such as total air temperature, altitude, inlet pressure, bleed air flow and bleed air pressure, and the output variables 14 comprise one or more performance indicators for a gas turbine engine, such as exhaust gas temperature. However, it will be appreciated by one of skill in the art that the simulator model 10, the input variables 12, and the output variables 14 can pertain to operations or other characteristics of any one of a number of different types of apparatus, systems or processes.

Turning now to FIG. 2, a design of experiments ("DOE") process 16 is shown for generating a simulator model 10 using historical data 18 for the input variables 12 and the output variables 14. The DOE process 16 comprises a first step 20, in which data points 22 are gathered from the historical data 18.

Preferably each data point 22 comprises corresponding values for each input variable 12 and each output variable 14, so that the data points 22 represent more accurate and meaningful relationships between the input variables 12 and the output variables 14. For example, in the case of a gas turbine engine, each data point 22 preferably includes values for each of the input variable 12 environmental conditions affecting turbine engine performance during a particular time period, as well as values for each of the output variable 14 engine turbine performance measures resulting from this particular set of environmental conditions. By including values for each of the input variables 12 and each of the output variables 14 in each data point 22, this preferred embodiment helps to prevent a situation in which the effects of a particular input variable 12 may otherwise be masked or incorrectly attributed to another input variable 12, which could occur if the particular input variable 12 did not have a value represented in a particular data point. However, it will be appreciated that in some situations values may be unavailable for one or more of the input variables 12 or output variables 14 in a particular data point 22, in which case the data point 22 may take a different configuration with less than all of the variable values.

It will also be appreciated that the historical data 18 may be obtained in any one of a number of different manners, for example from sensor records of prior operations of an apparatus or system. Next, in step 24 a data set 26 is generated by assembling the various data points 22. The data set 26 comprises the various data points 22 of the historical data 18.

Next, in step 28, the data set 26 is analyzed so as to split fault data 30 from no fault data 32. For the purposes of step 28, the fault data 30 includes any data points 22 for which an output variable 14 value is determined to be caused by factors other than the input variables 12. For example, in the example of a gas turbine engine, the fault data 30 may include data points 22 for which the output variable 14 values are determined to be caused in significant part by some problem in the gas turbine engine, or the operation thereof, rather than by any environmental conditions that may be represented in the input variables 12. For the purposes of step 28, the no fault data 32 includes any data points 22 that are not fault data 30. In other words, the no fault data 32 includes data points 22 for which the output variable 14 values are determined to be caused predominantly by the input variables 12. As shown, the fault data 30 is removed from the data set 26 in step 34, the fault data 30 thereby becoming removed data 36. Conversely, the no fault data 32 is retained in step 38, resulting in a revised data set 40 comprising data points 22 of the no fault data 32. The revised data set 40 allows for a more accurate modeling of the effects of the input variables 12 on the output variables 14.

Next, in step 42, the data points 22 of the revised data set 40 are supplied to a neural network model 44 for the purposes of generating a simulator model 10. In a preferred embodiment a feed-forward neural network model 44 is used; however, it will be appreciated that any one of a number of different types of nonlinear models can be used for the neural network model 44. Regardless of the particular type of model used, in step 46 the neural network model 44 generates the simulator model 10, which includes one or more formulas modeling the effects of the input variables 12 on the output variables 14. For ease of reference, steps 42 and 46 will be collectively hereafter referenced as a single step 48, "Build a simulator model", as depicted in FIG. 3.

The simulator model 10 can be a very useful tool in designing, monitoring, and analyzing the particular apparatus, systems or processes for which the simulator model 10 is used. For example, in the above-mentioned application of a gas turbine engine, the simulator model 10 can be used for designing a gas turbine engine or components or parts thereof, improving the engine, components or parts, and predicting performance of an engine, among various other uses. The simulator model 10 can save significant time and money, particularly when (i) the apparatus, system or process to be studied is expensive or difficult to obtain; (ii) it is difficult, expensive or time consuming to run comprehensive testing on the apparatus, system or process; and/or (iii) available models lack sufficient accuracy, precision, simplicity or speed in running.

Figure 3:
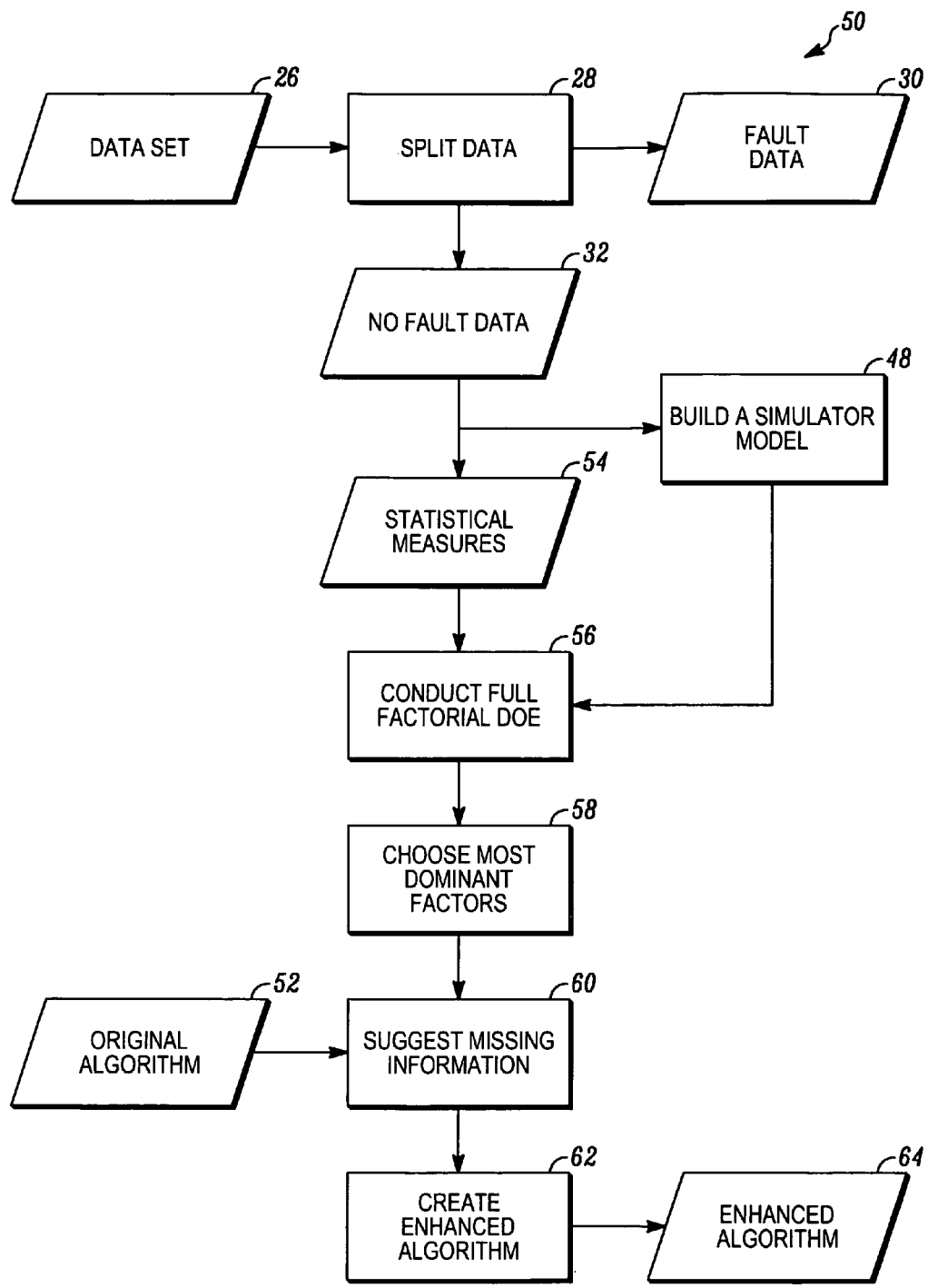
FIG. 3 depicts one embodiment of a method for generating a design of experiments and an enhanced algorithm.

FIG. 3 depicts another embodiment of the invention, namely an extended process 50 for enhancing an original algorithm 52. The extended process 50 includes steps 20-48 of the previously described DOE process 16, as well as additional steps 56, 58, 60, and 62. It will be appreciated that, for clarity and ease of both depiction and description, not all of the steps 20-48 are shown in FIG. 3.

The original algorithm 52 includes a subset of the input variables 12, namely certain input variables 12 originally determined to have substantial effects on the output variables 14. It will be understood that the original algorithm 52 may be commonly known in the industry, and/or may be the result of empirical testing, a theory or hypothesis, or any one of a number of different ways to generate an algorithm. Regardless of the origin of the original algorithm 52, the extended process 50 uses a series of steps for enhancing the original algorithm 52.

The extended process 50, similar to the DOE process 16, begins with generating the data set 26, comprising data points 22 from the historical data 18. The data set 26 is split into fault data 30 and no fault data 32, as with the DOE process 16. Next, in step 48 the simulator model 10 is built, via the process set forth in greater detail in steps 42 and 46 of FIG. 2, utilizing the neural network model 44.

In addition, statistical measures 54 are selected for the revised data set 40, and values for the statistical measures 54 are determined for each of the input variables 12, based on the data points 22 in the revised data set 40, for subsequent use with the simulator model 10. As shown in FIG. 3, and in more detail in FIG. 4, in a preferred embodiment the statistical measures 54 include minimum, median and maximum values for each of the input variables 12 in the revised data set 40. However, it will be appreciated that the statistical measures 54 may include any one of a number of other measures such as the mean, mode, lower quartile and/or upper quartile values. Regardless of the particular measures chosen, the use of the statistical measures 54 provides an easier, quicker and more cost effective method for testing the simulator model 10, and for enhancing the original algorithm 52, as compared with using the entire revised data set 40.

Figures 4, 5, 6:
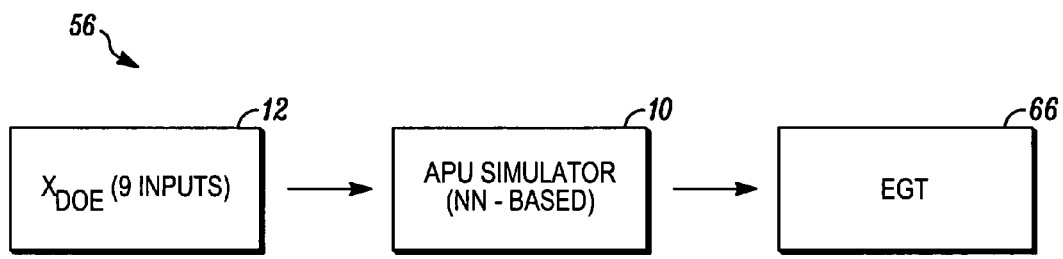
FIG. 4 depicts an example of a full factorial design from the method of FIG. 3.
FIG. 5 depicts an application of the full factorial design from the example of FIG. 4 in connection with an APU simulator.
FIG. 6 depicts use of statistical analysis of variance techniques in evaluating the input variables from the method of FIG. 2 in connection with the example of FIG. 4.

Next, in step 56, the data points 22 corresponding to the values of the statistical measures 54 are used, in conjunction with the simulator model 10, to predict values of the output variables 14 corresponding to the values of the statistical measures 54 for the input variables 12. As shown in FIGS. 4 and 5 in a preferred embodiment involving a gas turbine engine, the minimum, median, and maximum values of various input variables 12, such as total air temperature (TAT), altitude (ALT), inlet pressure (P2A), generator load (GLA), bleed air flow (WB), bleed air pressure (PT), inlet guide vane angle (IGV), surge control valve position (SCV), and low oil temperature (LOT), are used to determine a number of corresponding data points 22 for use with the simulator model 10 in determining calculated values 66 of a particular output variable 14, namely the calculated value 66 for exhaust gas temperature, represented as EGT*. As mentioned above, it will be appreciated that the simulator model 10, the input variables 12, the output variables 14, and the statistical measures 54 can take any of a number of different forms.

Returning now to FIG. 3, in step 58 the results of step 56 are analyzed to determine the dominant input variables 12, specifically the input variables 12 having dominant effects on the output variables 14. In a preferred embodiment, the analysis in step 58 is conducted using statistical analysis of variance ("ANOVA") techniques. FIG. 6 depicts use of such ANOVA techniques with respect to the above-mentioned application of a gas turbine engine.

Specifically, FIG. 6 displays results of ANOVA testing on the effects of specific input variables 12 on EGT*, which, as mentioned above, represents the calculated value 66 of the exhaust gas temperature (EGT) output variable 14 in this example. FIG. 6 provides, among other information, a value for degrees of freedom (DF) 68 and an F-statistic 70 corresponding to each input variable 12. For any given degrees of freedom 68, a larger F-statistic 70 for a particular input variable 12 represents a larger measure of dominance for that particular input variable 12. In this example, FIG. 6 shows altitude (ALT), inlet pressure (P2A), bleed air flow (WB), generator load (GLA), total air temperature (TAT), bleed air pressure (PT), and inlet guide vane angle (IGV) having the highest measures of dominance on EGT*, with surge control valve position (SCV) and low oil temperature (LOT) having the smallest measures of dominance on EGT*. While FIG. 6 depicts a particular application of ANOVA testing, it will be appreciated that any one of a number of different techniques can be used in the step 58 analysis, and that such analysis can be used in any one of a number of different applications.

Returning again to FIG. 3, in step 60 the determination of the dominant input variables 12 from step 58 is compared with the input variables 12 from the original algorithm 52, to identify any candidates for adding to or removal from the original algorithm 52. For example, if certain input variables 12 were not in the original algorithm 52 but nonetheless were determined to be dominant input variables 12 in step 58, such as altitude (ALT), bleed air flow (WB), and bleed air pressure (PT) in the example of FIG. 6, such input variables 12 are identified as candidates for adding to the original algorithm 52. Conversely, if any input variables 12 were in the original algorithm 52 but nonetheless were not determined to be dominant input variables 12 in step 58 (not depicted in FIG. 6), such input variables 12 would be candidates for removal from the original algorithm 52. As mentioned above, while FIG. 6 depicts one particular embodiment for algorithm selection with ANOVA testing, it will be appreciated that any one of numerous different techniques can be used in determining the candidates for addition to and removal from the original algorithm 52.

Regardless of the particular techniques used in steps 58 and 60, the results of these steps are utilized in step 62 in generating an enhanced algorithm 64, which represents the addition and/or removal of certain input variables 12 as determined in steps 58 and 60. The enhanced algorithm 64 can be used for various purposes such as, for example, improved modeling and analysis of the effects of the input variables 12 on the output variables 14. For example, step 42 of the DOE process 16 can be re-run using values from the revised data set 40 corresponding with the input variables 12 in the enhanced algorithm 64, along with the output variables 14, to generate a new simulator model 10 in step 46 corresponding with the enhanced algorithm 64. As shown in FIGS. 7-10 with respect to the above-mentioned gas turbine engine application, the enhanced algorithm 64 can also be used to test the simulator model 10 and to compare the simulator model 10 with other models such as those utilizing linear regression.

Figures 7, 8:
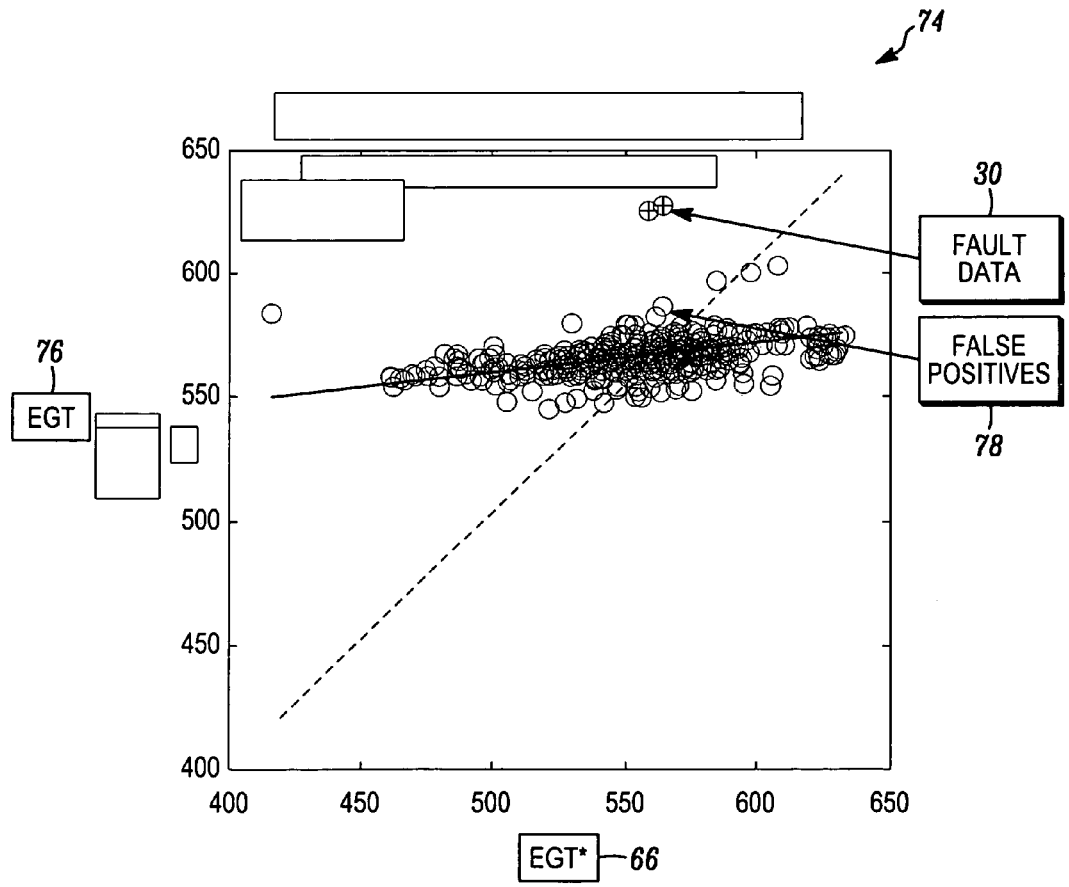
FIG. 7 depicts an example of a linear regression model as applied to the example in FIG. 4.
FIG. 8 depicts results from the linear regression model from FIG. 7.

For example, FIG. 7 depicts a linear regression model 72 utilizing the enhanced algorithm 64 for the above-mentioned gas turbine engine example. FIG. 8 depicts results 74 from the linear regression model 72 for this example, through a graph of the calculated values 66 of the output variable 14 (depicted as EGT*) versus actual values 76 of the output variable 14 (depicted as EGT). As shown in FIG. 8, the linear regression model 72 detected the fault data 30, but also generated false positives 78 for the fault data 30.

Figure 9:
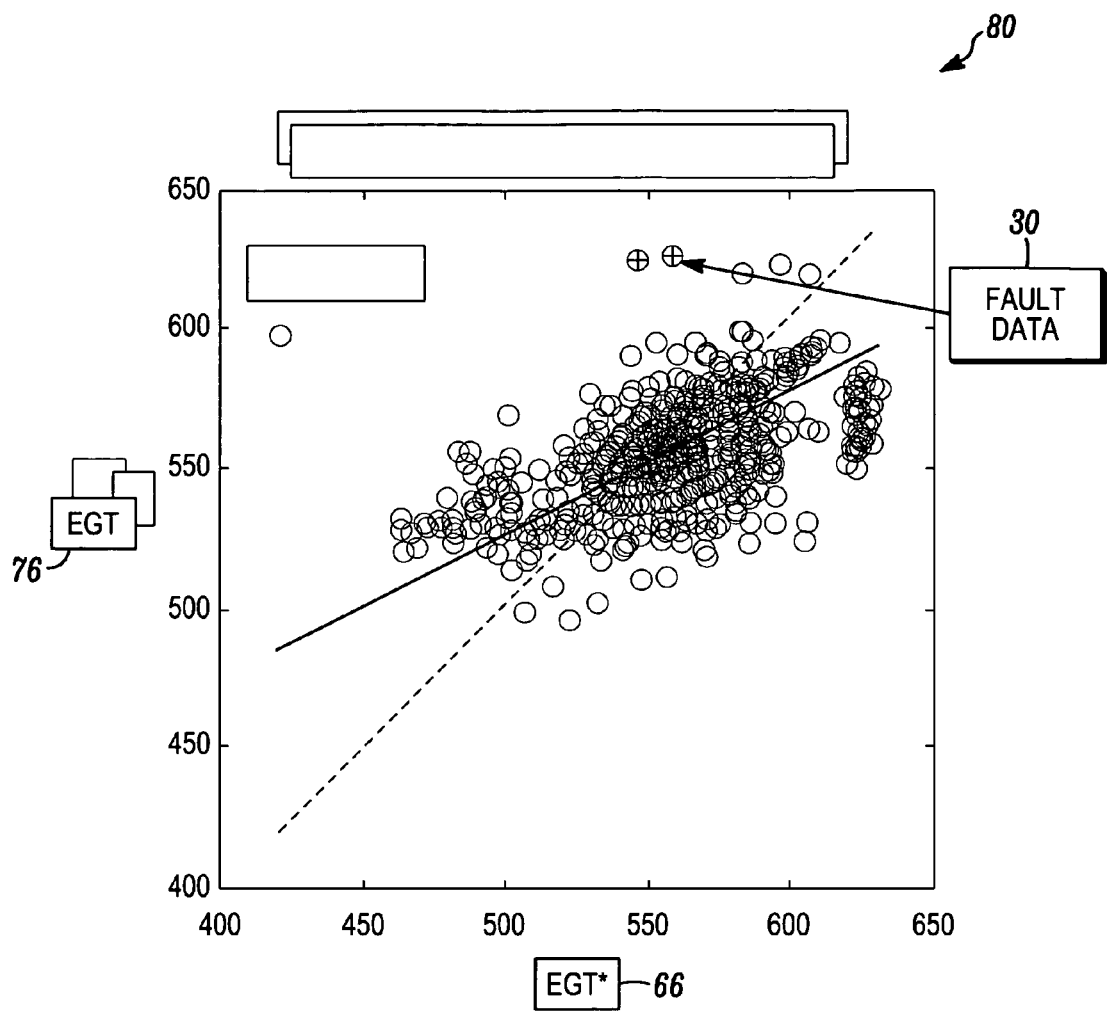
FIG. 9 depicts results from the nonlinear simulator model from FIGS. 1-3 as applied to the example in FIG. 4.

FIG. 9 depicts, for comparison, results 80 of the simulator model 10 as applied to this particular example, using the enhanced algorithm 64. As shown in FIG. 9, the simulator model 10 detected the fault data 30, and had no false positives 78 for the fault data 30.

Figure 10:
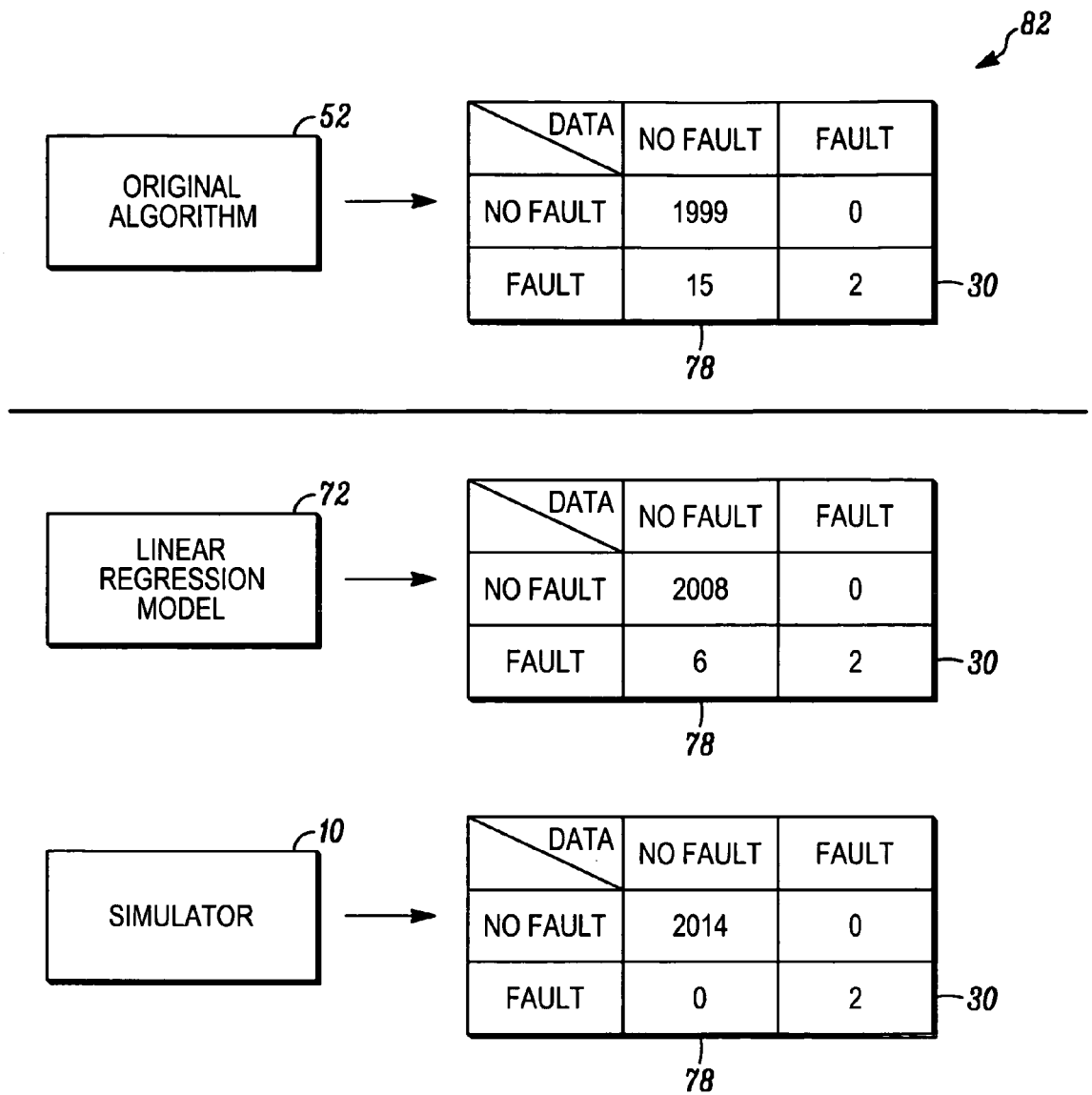
FIG. 10 depicts a confusion matrix comparing the results from the linear regression model from FIG. 8 with the results from the nonlinear simulator model from FIG. 9.

In FIG. 10, a confusion matrix 82 compares the respective results 74 from the linear regression model with the results 80 of the simulator 10, and compares the respective results 74 and 80 with results of the original algorithm 52 (not shown in graphical form). As shown in the confusion matrix 82, the simulator model 10 performed better than the linear regression model 72 in this application. For example, the simulator model 10 had zero false-positives 78 for fault data 30, compared with six false-positives 78 for the linear regression model 72, while still identifying all of the fault data 30. The simulator model 10 and the linear regression model 72 both performed better than the original algorithm 52, which had fifteen false-positives 78 for fault data 30.

It will be appreciated that the extended process 50 and the enhanced algorithm 64 can be used for various other types of testing, modeling, and analysis, and can be used in any one of a number of different applications.

Figure 11:
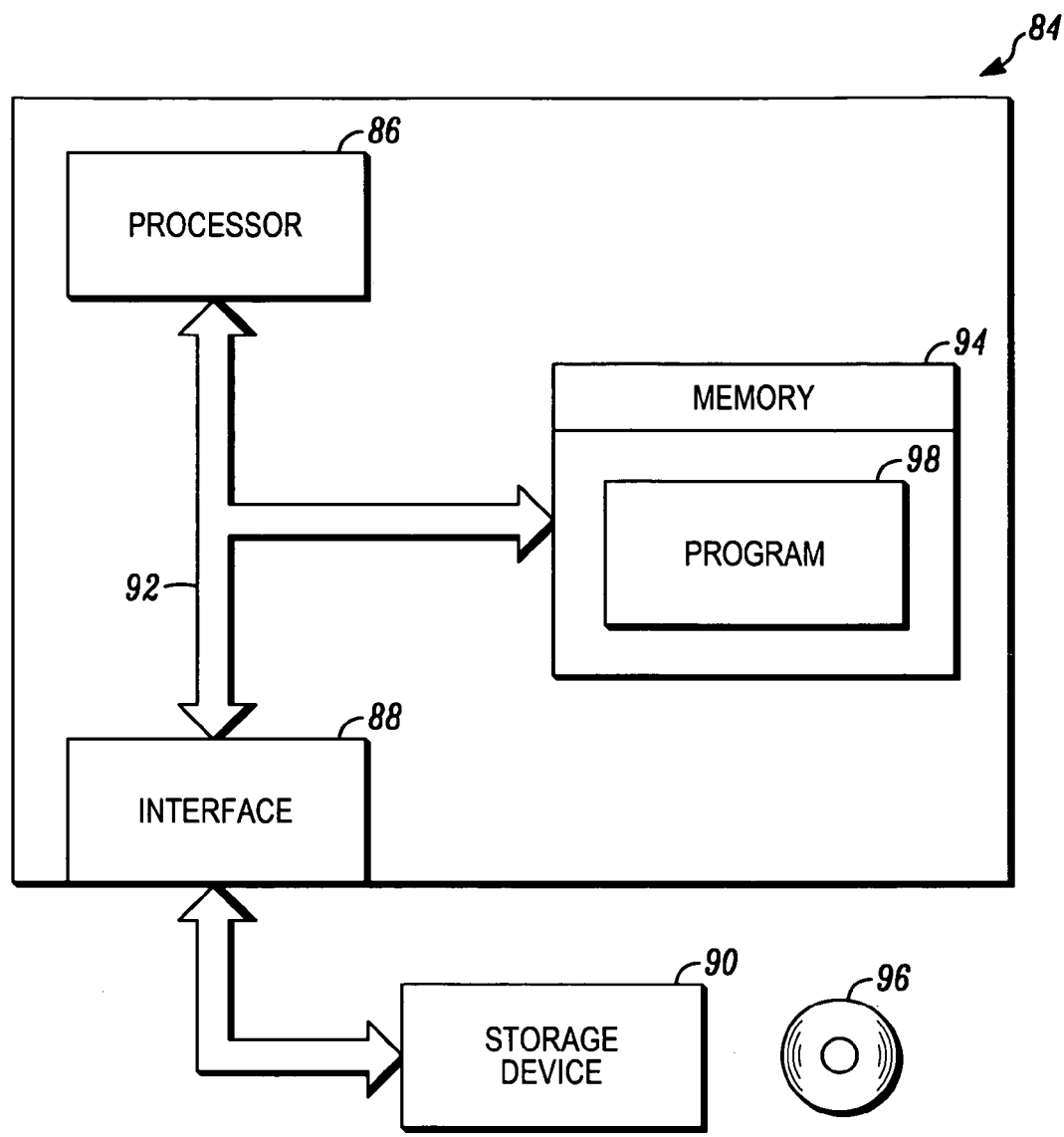
FIG. 11 depicts an exemplary computer system for implementing the methods of FIGS. 2-3.

In addition, the DOE process 16 and the extended process 50 can be implemented in a wide variety of platforms including, for example, any one of numerous computer systems. Turning now to FIG. 11, an exemplary computer system 84 is illustrated by way of example. Computer system 84 illustrates the general features of a computer system that can be used to implement the DOE process 16 and the extended process 50. Of course, these features are merely exemplary, and it should be understood that the processes 16, 50 can be implemented using different types of hardware that can include more or different features. It should be noted that the computer system 84 can be implemented in many different environments, such as within a particular apparatus or system, or remote from a particular apparatus or system. The exemplary computer system 84 includes a processor 86, an interface 88, a storage device 90, a bus 92, and a memory 94.

The processor 86 performs the computation and control functions of the computer system 84. The processor 86 may comprise any type of processor, include single integrated circuits such as a microprocessor, or may comprise any suitable number of integrated circuit devices and/or circuit boards working in cooperation to accomplish the functions of a processing unit. In addition, the processor 86 may comprise multiple processors implemented on separate systems. In addition, the processor 86 may be part of an overall system for an apparatus or process. During operation, the processor 86 executes the programs contained within the memory 94 and as such, controls the general operation of the computer system 84.

The memory 94 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 94 may be a single type of memory component, or it may be composed of many different types of memory components. In addition, the memory 94 and the processor 86 may be distributed across several different computers that collectively comprise the computer system 84. For example, a portion of the memory 94 may reside on a computer within a particular apparatus or process, and another portion may reside on a remote computer.

The bus 92 serves to transmit programs, data, status and other information or signals between the various components of the computer system 84. The bus 92 can be any suitable physical or logical means of connecting computer systems and components. This includes, but is not limited to, direct hard-wired connections, fiber optics, infrared and wireless bus technologies.

The interface 88 allows communication to the computer system 84, and can be implemented using any suitable method and apparatus. It can include one or more network interfaces to communicate to other systems, terminal interfaces to communicate with technicians, and storage interfaces to connect to storage apparatuses such as the storage device 90. The storage device 90 can be any suitable type of storage apparatus, including direct access storage devices such as hard disk drives, flash systems, floppy disk drives and optical disk drives. As shown in FIG. 11, the storage device 90 can comprise a disc drive device that uses discs 96 to store data.

In accordance with a preferred embodiment, the computer system 84 includes a program 98 for use in implementing the DOE process 16 and/or the extended process 50. During operation, the program 98 is stored in the memory 94 and executed by the processor 86. As one example implementation, the computer system 84 may also utilize an Internet website, for example for providing or maintaining data or performing operations thereon.

It should be understood that while the embodiment is described here in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 96), and transmission media such as digital and analog communication links.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for a design of experiments for modeling the effects of two or more input variables on one or more output variables, the method comprising the steps of:
   (a) generating a data set comprising data points from historical data for the input variables and the output variables, each data point comprising corresponding values for one or more of the input variables and one or more of the output variables from the historical data;
   (b) identifying fault data points in the historical data, a fault data point being a data point from the data set from the historical data in which an output variable value is determined to be caused by factors other than the input variables;
   (c) removing the identified fault data points from the data set, thereby generating a revised data set with no fault data points, a no fault data point being a data point from the data set from the historical data that is not determined to be a fault data point;
   (d) supplying the no fault data points from the revised data set into a nonlinear neural network model; and
   (e) deriving a simulator model characterizing a relationship between the input variables and the output variables using the nonlinear neural network model with the supplied data.

2. The method of claim 1, wherein the output variables comprise one or more performance indicators for a turbine engine, and the input variables comprise factors affecting performance of the turbine engine.

3. The method of claim 1, further comprising the steps of:
   (f) selecting a plurality of statistical measures to characterize the no fault data points with respect to each of the input variables in the revised data set;
   (g) determining statistical measure values for each statistical measure for each of the input variables, based on the no fault data points in the revised data set;
   (h) supplying the statistical measure values into the derived simulator model; and
   (i) determining calculated values from the derived simulator model of one or more of the output variables corresponding to the respective statistical measure values of the input variables.

4. The method of claim 3, wherein the statistical measures are selected from the group consisting of the minimum, lower quartile, median, mean, mode, upper quartile, and maximum values from the revised data set for each variable.

5. The method of claim 3, wherein the statistical measures comprise the minimum, median and maximum values from the data set for each input variable.

6. The method of claim 3, wherein the determined statistical measure values and calculated values are used to test the derived simulator model.

7. The method of claim 3, further comprising the steps of:
(j) generating an original algorithm for modeling the output variables as a function of one or more of the input variables;
(k) selecting dominant input variables, each of the dominant input variables being the input variables having dominant effects on the output variables; and
(l) generating an enhanced algorithm for modeling the output variables as a function of one or more of the dominant input variables.

8. The method of claim 7, wherein the dominant input variables are selected based on statistical analysis of variance (ANOVA) calculations.

9. The method of claim 7, further comprising the steps of:
selecting additional input variables, for inclusion in the enhanced algorithm, each of the additional input variables being an input variable that was not in the original algorithm but was selected as a dominant input variable in step (k); and
removing input variables, for exclusion from the enhanced algorithm, that were in the original algorithm but were not selected as dominant inputs variables in step (k).

10. A method for generating an enhanced algorithm for representing the effects of two or more input variables on an output variable, comprising:
(a) generating an original algorithm for modeling the output variables as a function of one or more of the input variables;
(b) generating a data set comprising data points from historical data for the input variables and the output variables, each data point comprising corresponding values for one or more of the input variables and one or more of the output variables;
(c) identifying fault data points in the historical data, a fault data point being a data point in which an output variable value is determined to be caused by factors other than the input variables;
(d) removing the identified fault data points from the data set, thereby generating a revised data set with data points;
(e) supplying the data points from the revised data set into a nonlinear neural network model;
(f) deriving a simulator model characterizing a relationship between the input variables and the output variables using the nonlinear neural network model with the supplied data;
(g) selecting a plurality of statistical measures to characterize the data points with respect to each of the input variables in the revised data set;
(h) determining statistical measure values for each statistical measure for each of the input variables, based on the data points in the revised data set;
(i) supplying the statistical measure values into the derived simulator model;
(j) determining calculated values from the derived simulator model of one or more of the output variables corresponding to the respective statistical measure values of the input variables;
(k) selecting dominant input variables, each of the dominant input variables being the input variables having dominant effects on the output variables; and
(l) generating an enhanced algorithm for modeling the output variables as a function of one or more of the dominant input variables.

11. The method of claim 10, wherein the output variables comprise one or more performance indicators for a turbine engine, and the input variables comprise factors affecting performance of the turbine engine.

12. The method of claim 10, wherein the statistical measures are selected from the group consisting of the minimum, lower quartile, median, mean, mode, upper quartile, and maximum values from the revised data set for each variable.

13. The method of claim 10, wherein the statistical measures comprise the minimum, median and maximum values from the revised data set for each variable.

14. The method of claim 10, wherein the determined statistical measure values and calculated values are used to test the derived simulator model.

15. The method of claim 10, wherein the dominant input variables are selected based on statistical analysis of variance (ANOVA) calculations.

16. The method of claim 10, further comprising the steps of:
selecting additional input variables, for inclusion in the enhanced algorithm, each of the additional input variables being an input variable that was not in the original algorithm but was selected as a dominant input variable in step (k); and removing input variables, for exclusion from the enhanced algorithm, that were in the original algorithm but were not selected as dominant inputs variables in step (k).

17. The method of claim 10, further comprising:
deriving a linear regression model characterizing the relationship between the input variables and the output variables utilizing the enhanced algorithm;
analyzing results of the derived linear regression model;
analyzing results of the derived simulator model using the enhanced algorithm; and
comparing the results of the derived linear regression model with the results of the derived simulator model.

18. A system for modeling the effects of two or more input variables on an output variable comprising:
(a) means for generating a data set comprising data points from historical data for the input variables and the output variables, each data point comprising corresponding values for one or more of the input variables and one or more of the output variables;
(b) means for identifying fault data points in the historical data, a fault data point being a data point in which an output variable value is determined to be caused by factors other than the input variables;
(c) means for removing the identified fault data points from the data set, thereby generating a revised data set with data points;
(d) means for supplying the data points from the revised data set into a nonlinear neural network model; and
(e) means for deriving a simulator model characterizing a relationship between the input variables and the output variables using the nonlinear neural network model with the supplied data.

19. The system of claim 18, wherein the output variables comprise one or more performance indicators for a turbine engine, and the input variables comprise factors affecting performance of the turbine engine.

20. The system of claim 18, wherein the system further comprises:
(f) means for selecting a plurality of statistical measures to characterize the data points with respect to each of the input variables in the revised data set;

(g) means for determining statistical measure values for each statistical measure for each of the input variables, based on the data points in the revised data set;
(h) means for supplying the statistical measure values into the derived simulator model; and
(i) means for determining calculated values from the derived simulator model of one or more of the output variables corresponding to the respective statistical measure values of the input variables.

21. The system of claim 18, further comprising:
means for implementing the derived simulator model.

22. A program product comprising:
(a) a program configured to at least facilitate:
  (i) generating a data set comprising data points from historical data for the input variables and the output variables, each data point comprising corresponding values for one or more of the input variables and one or more of the output variables from the historical data;
  (ii) identifying fault data points in the historical data, a fault data point being a data point from the data set from the historical data in which an output variable value is determined to be caused by factors other than the input variables;
  (iii) removing the identified fault data points from the data set, thereby generating a revised data set with no fault data points, a no fault data point being a data point from the data set from the historical data that is not determined to be a fault data point;
  (iv) supplying the no fault data points from the revised data set into a nonlinear neural network model; and
  (v) deriving a simulator model characterizing a relationship between the input variables and the output variables using the nonlinear neural network model with the supplied data; and
(b) a computer-readable signal bearing media bearing the program.

23. An apparatus comprising:
(a) a processor;
(b) a memory coupled to the processor; and
(c) a program residing in memory and being executed by the processor, the program configured to characterize a relationship between one or more input variables and one or more output variables through at least the following steps:
  (i) generating a data set comprising data points from historical data for the input variables and the output variables, each data point comprising corresponding values for one or more of the input variables and one or more of the output variables from the historical data;
  (ii) identifying fault data points in the historical data, a fault data point being a data point from the data set from the historical data in which an output variable value is determined to be caused by factors other than the input variables;
  (iii) removing the identified fault data points from the data set, thereby generating a revised data set with no fault data points, a no fault data point being a data point from the data set from the historical data that is not determined to be a fault data point;
  (iv) supplying the no fault data points from the revised data set into a nonlinear neural network model; and
  (v) deriving a simulator model characterizing a relationship between the input variables and the output variables using the nonlinear neural network model with the supplied data.

24. The apparatus of claim 23, wherein the processor is operable to implement the derived simulator model.

* * * * *